US007959191B2

(12) United States Patent
Schouten

(10) Patent No.: US 7,959,191 B2
(45) Date of Patent: Jun. 14, 2011

(54) WATER FLOW THROUGH POLE WITH LOCKING MECHANISM

(75) Inventor: Pieter Schouten, Berkeley, CA (US)

(73) Assignee: Carrand Companies, Inc., Compton, CA (US)

( * ) Notice: Subject to any disclaimer, the term of this patent is extended or adjusted under 35 U.S.C. 154(b) by 0 days.

(21) Appl. No.: 12/099,645

(22) Filed: Apr. 8, 2008

(65) Prior Publication Data

US 2009/0249569 A1 Oct. 8, 2009

(51) Int. Cl.
*F16L 27/12* (2006.01)

(52) U.S. Cl. ........................................ 285/298; 285/7

(58) Field of Classification Search .............. 285/7, 302, 285/303, 298, 145.1, 145.4
See application file for complete search history.

(56) References Cited

U.S. PATENT DOCUMENTS 373,950 A * 11/1887 Sweet .......................... 285/303
407,151 A * 7/1889 Beck .......................... 285/303
2,434,358 A * 1/1948 Frank .......................... 439/788
2,579,314 A * 12/1951 Grumblatt .......................... 285/7
3,083,041 A * 3/1963 Owenmark .......................... 285/7
3,244,437 A * 4/1966 Belicka et al. .......................... 285/7
3,351,359 A * 11/1967 Ferraris .......................... 285/7
3,791,624 A * 2/1974 Payson .......................... 254/212
5,425,225 A * 6/1995 Franco .......................... 56/332
5,692,782 A * 12/1997 Fischer .......................... 285/7
5,836,620 A * 11/1998 Wang et al. .......................... 285/7
6,148,474 A * 11/2000 Ohara et al. .......................... 15/377
6,209,925 B1 * 4/2001 Edin .......................... 285/7
6,322,006 B1 * 11/2001 Guo .......................... 239/532
6,431,607 B1 * 8/2002 Kittelmann et al. .......................... 285/7
6,565,123 B2 * 5/2003 Schiemann et al. .......................... 285/7
6,609,847 B1 * 8/2003 Wang .......................... 401/137
6,634,822 B1 * 10/2003 Wang .......................... 401/137
6,719,331 B1 * 4/2004 Chen .......................... 285/302
6,789,751 B1 * 9/2004 Fan .......................... 239/525
6,832,784 B1 * 12/2004 Chen .......................... 285/7
7,025,383 B2 * 4/2006 Canale .......................... 285/7
7,494,161 B2 * 2/2009 Kanai et al. .......................... 285/403
7,516,988 B2 * 4/2009 Lin .......................... 285/7
2008/0284158 A1 * 11/2008 Lin .......................... 285/7
* cited by examiner

*Primary Examiner* — Aaron Dunwoody
(74) *Attorney, Agent, or Firm* — George R. McGuire; David B. Woycechowsky; Bond Schoeneck & King

(57) ABSTRACT

An extension pole including an outer tube connected to a water source and an inner tube positioned in a telescoping relationship to the outer tube. The inner tube includes a series of spaced apart openings that are engaged by a biased locking member positioned on the end of the outer tube. The locking member may be manually released by activation of a release button connected to locking member, thereby allowing inner and outer tubes to be moved with respect to each other. The extension pole also includes a locking nut assembly positioned on the free end of the inner tube for attaching the tube to cleaning tool and preventing rotation of the cleaning tool during use.

7 Claims, 2 Drawing Sheets

16
12
22
52
38
28
36
20
3
24
50
56
54
58
60
62
64
66
26
46

30
34
32

40
44
42

WATER FLOW THROUGH POLE WITH LOCKING MECHANISM

BACKGROUND OF THE INVENTION

1. Field of the Invention

The present invention relates to an extension pole for interconnecting a water source and washing implement and, more particularly, to a telescoping extension pole having a locking mechanism for retaining the pole in various length configurations.

2. Description of the Related Art

Many types of cleaning implements, as well as other tools, are equipped with an elongated handle which is grasped by the user to manipulate the device carried on the distal end of the handle. Such implements include those wherein a liquid, such as water or a cleaning solution, is supplied to one end of a hollow, metal tube and allowed to flow through the tube to be discharged at the opposing end, often through a removably mounted cleaning tool, such as a scrubber, sponge, or brush. Extendible versions of these implements generally include an inner and an outer tube that are positioned in a telescoping arrangement, with the inner tube adapted to provide for the flow of fluids therethrough. Some conventional extendible poles also include locking mechanisms for retaining the telescoping inner and outer tubes in a fixed position relative to each other at various lengths selected by the user. The locking mechanisms are often quite cumbersome, however, and require that the user twist a locking nut positioned on the outer tube through several rotations to advance it over a clamping element that presses tightly against the inner tube, thereby locking the telescoping poles into their current position.

BRIEF SUMMARY OF THE INVENTION

It is therefore a principal object and advantage of the present invention to provide a locking mechanism that is easy to use.

It is another object and advantage of the present invention to provide a locking mechanism that securely retains a telescoping extension pole in various positions It is a further object and advantage of the present invention to provide an extension pole that prevents rotation of an attached implement.

In accordance with the foregoing objects and advantages, the present invention provides an extension pole comprising an outer tube extending along a longitudinal axis and having a first end adapted for interconnection to a water source, such as a hose, and a second end for receiving an inner tube extending along the longitudinal axis and positioned in a telescoping relationship to the outer tube. The inner tube includes a first end adapted to be positioned into the second end of the outer tube and a second end that is adapted for interconnection to a cleaning implement, such as a scrubber, sponge, or brush. Inner tube preferably includes at least one portion comprising a first tubular section in fluid communication with the outer tube positioned inside of a second tubular section that is not in fluid communication with the outer tube. Second tubular section further includes a series of openings, such as slots, holes, or grooves, which are formed therein and spaced apart along the longitudinal axis. Outer tube further comprises a locking assembly positioned on its second end that includes an locking member extending inwardly for engaging one of the openings formed in the second tubular section of the inner tube. Locking assembly further includes a spring or other bias element for biasing the locking member inwardly to securely engage the openings, and a release button interconnected to locking member for the manual application of a force opposite to the bias element to move the locking member out of engagement with the openings, thereby allowing inner and outer tubes to be moved with respect to each other. The extension pole further comprises a locking nut positioned on the second end of the inner tube for releasably engaging a cleaning tool and preventing rotation of the cleaning tool during use.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
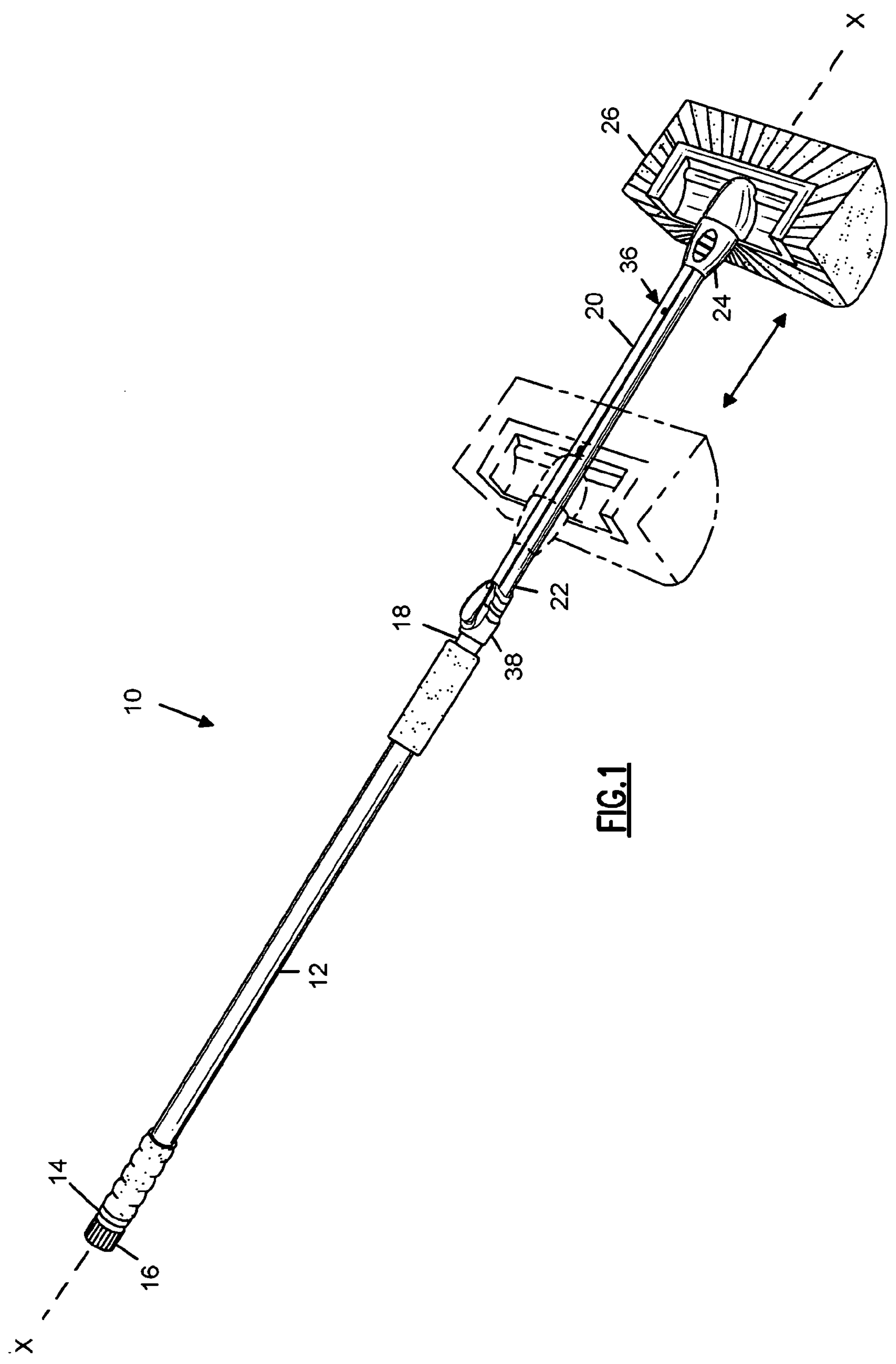
FIG. 1 is a perspective view of an extension pole according to the present invention.

Referring now to the drawings, wherein like reference numerals refer to like parts throughout, there is seen in FIG. 1 an extension pole 10 according to the present invention. Pole 10 comprises an outer tube 12 extending along longitudinal axis X-X and having a first end 14 including a connector 16 adapted for interconnection to a water source, such as a hose, and a second end 18 for receiving an inner tube 20 also extending along longitudinal axis X-X and positioned in a telescoping relationship to outer tube 12.

Figures 2, 3, 4:
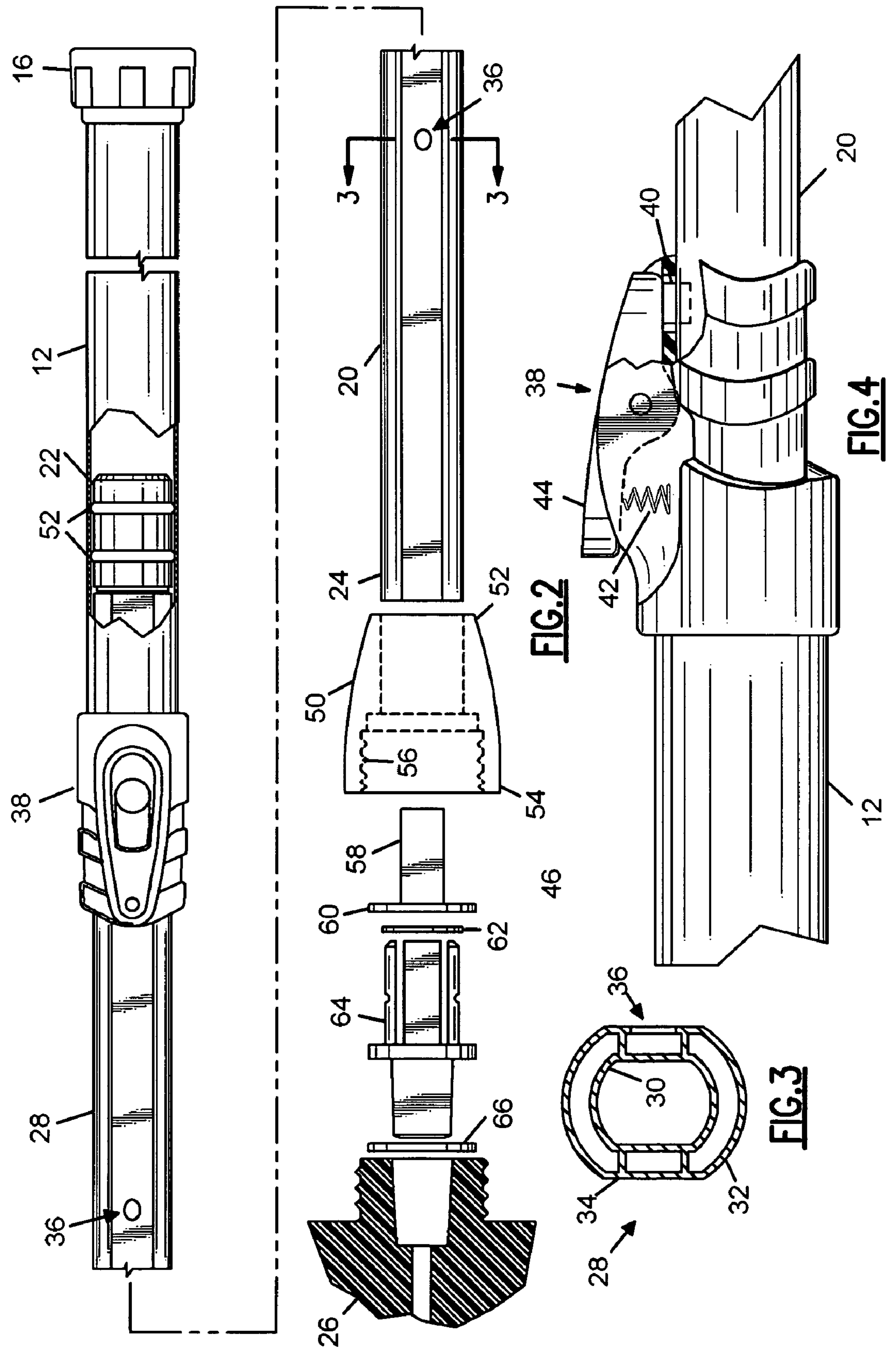
FIG. 2 is a top exploded view of a locking assembly for an extension pole according to the present invention.
FIG. 3 is a cross-section of an extension pole according to the present invention, taken along line 3-3 of FIG. 2.
FIG. 4 is a side view of a locking assembly for an extension pole according to the present invention.

Inner tube 20 includes a first end 22 adapted to be positioned into second end 18 of outer tube 12, and a second end 24 that is adapted for interconnection to a cleaning implement 26, such as a scrubber, sponge, or brush. As seen in FIGS. 2 and 3, inner tube 20 preferably includes at least one longitudinal portion 28 comprising a first tubular section 30 in fluid communication with outer tube 12 that is positioned within a second tubular section 32 that is not in fluid communication with outer tube 12. Second tubular section 32 is preferably supported in spaced relation to first tubular section 30 by one or more ribs 34. Tubular sections 30 and 32 may be formed by extrusion, co-extrusion, rolling, forming, injection molding or other known material forming process. Tubular sections 30 and 32 may be formed from plastic, fiberglass, fiber with resin composite, aluminum, steel, or other metal.

As seen in FIG. 1, second tubular section 32 further includes a series of features 36, such as openings, slots, holes, detents, or grooves, which are formed therein and spaced apart along the longitudinal axis. As seen in FIG. 2, outer tube 12 further comprises a locking assembly 38 positioned on second end 18 that includes a locking member 40 extending inwardly with respect to inner tube 20 for engaging openings 36. Due to the separation of inner tube 20 into first tubular section 30 and second tubular section 32, water passing through pole 10 is channeled away from features 36 and locking assembly 38, thereby avoiding any interference with water flow.

Locking assembly 38 further includes a spring 42 or other biasing element for biasing locking member 40 inwardly to securely engage features 36, and a release lever 44 pivotally interconnected to locking assembly 38 and locking member 40 for the manual application of a force opposing spring 42 to move locking member 40 out of engagement with features 36, thereby allowing inner tube 20 and outer tube 12 to be moved with respect to each other. In another embodiment of the present invention, locking assembly comprises a high-tension biasing element for forcing locking member 40 into frictional contact with inner tube 20 sufficient to prevent telescoping with respect to outer tube, thereby eliminating the need for features 36 on inner tube 20.

Extension pole 10 further comprises a locking assembly 46 positioned on second end 24 of inner tube 20 for releasably engaging cleaning implement 26 and preventing rotation of implement 26 during use. As seen in FIG. 2, locking assembly 46 includes a locking nut 50 having a first end 52 for receiving second end 24 of inner tube 20, and a second end 54 having threads 56 therein for attachment to corresponding threads of implement 26 (see these threads at right hand side of implement 26 as shown in FIG. 2). Locking assembly 46 further comprises a retaining pin 58 including a shoulder 60 for retaining nut 50 on second end 24 of inner tube 20, a washer 62, a clamping sleeve 64, and a second washer 66. Advancement of nut 50 onto implement 26 thus causes compression of the components, thereby restricting rotational movement of locking assembly 46 and implement 26 relative to second end 24 of inner tube 20.

To provide a water-tight fit and prevent interference between water flow and locking assembly 38, first end 26 of inner tube 20 is closed with respect to first tubular section 30 and second tubular section 32, and may include a series of O-rings 52 around the outside thereof for engaging the inner surface of outer tube 12.

What is claimed is:

1. An extension pole, comprising:

a first tube comprising an inner surface defining an interior space;

a second tube positioned at least partially said the interior space of the first tube, with the second tube comprising an outer surface in a telescoping relationship with the inner surface of the first tube; and a locking assembly interconnected to one end of said first tube;

wherein:

the second tube further comprises at least one recess formed in its outer surface;

the locking assembly includes a locking member that is moveable between at least a locked position and an unlocked position;

the locking member and the second tube are sized, shaped and located so that the locking member protrudes into the recess when the locking member is in the locked position; and the locking member and the second tube are further sized, shaped and located so that the locking member is spaced away from the recess when the locking member is in the unlocked position;

wherein:

said second tube further comprises a first interior space, a second interior space and dividing hardware, with both the first interior space being enclosed in a fluid tight manner, the second interior space being at substantially enclosed, and with the at least one recess being formed as a hole extending from the outer surface of the second tube to the second interior space;

the first interior space of the first tube is located to be in fluid communication with the first interior space of the second tube;

the dividing hardware is sized, shaped and located to prevent the second interior space of the second tube from being in fluid communication with either of the first interior space of the first tube and the second interior space of the second tube; and the locking member and the second tube are sized, shaped and located so that the locking member protrudes into the second interior space when the locking member is in the locked position.

2. The pole of claim 1, wherein the shape of the recess is selected from the group consisting of an opening, a slot, a groove, a detent, and a hole.

3. The pole of claim 2, wherein said locking assembly further includes means for biasing said locking member away from the unlocked position and toward the locked position.

4. The pole of claim 3, wherein said locking assembly further includes means for manually moving said locking member from the locked position to the unlocked position.

5. The pole of claim 4, wherein said means for manually moving said locking member comprises a lever pivotally mounted to said locking assembly.

6. The pole of claim 3, wherein said means for biasing comprises a spring.

7. The pole of claim 1 further comprising a cleaning implement mechanically connected to said second tube, with the cleaning implement being structured to clean using flowing water that flows through the first and second tubes to the cleaning implement.

* * * * *